T. Miles,
Reciprocating Saw Mill.
No. 18,402.   Patented Oct. 13, 1857.
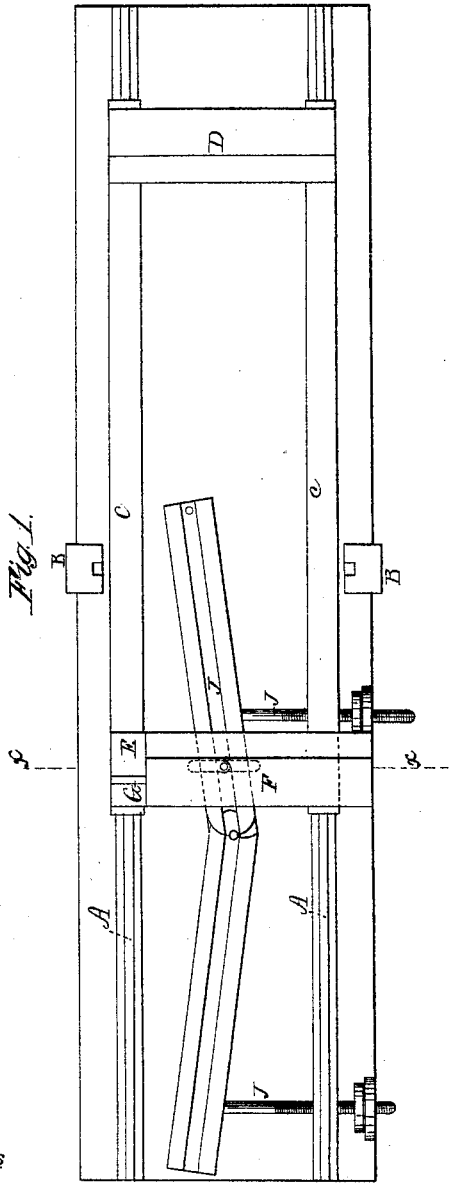
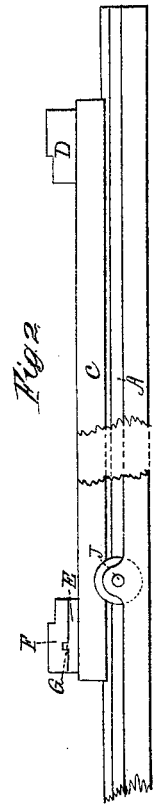
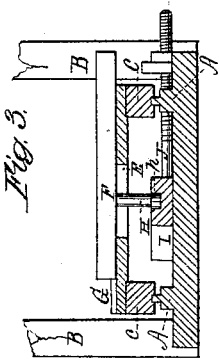
Witnesses
Inventor
Thomas Miles

UNITED STATES PATENT OFFICE.

THOMAS MILES, OF GREENBUSH, NEW YORK.

DEVICE FOR GUIDING THE LOGS IN SAWING GIVEN CURVATURES.

Specification of Letters Patent No. 18,402, dated October 13, 1857.

*To all whom it may concern:*

Be it known that I, THOMAS MILES, of Greenbush, in the county of Rensselaer and the State of New York, have made a new and useful Improvement in Sawmills for Sawing Crooked Timber; and I hereby declare the following to be a full and exact description thereof, reference being had to the annexed drawings, making a part of this specification, in which—

Figure 1, is a plan. Fig. 2, a side elevation, and Fig. 3 a transverse section of the mill at the line $x, x$.

The nature of my invention consists in constructing the "tail block" of the "carriage" with a movable top, and giving it a lateral motion by means of a grooved guide placed beneath it, whereby the timber to be cut is fed to the saw in the direction of its natural crook, or to any other required bend.

To enable others skilled in the art to make and use my invention I will describe its construction and operation.

The "ribbons," or guides for the carriage, A, A, are made of the ordinary form as are also the vertical guides for the "saw gate" B, B, and its appendages; C, C, are the side pieces of the carriage; D, the head block, and E the tail block for the same; F a movable top piece for the tail block, working on the guide G, H, a stud attached to the top piece F, and provided on its lower end with a roller $h$. I, a grooved guide laying beneath the carriage, and made with one or more joints for the purpose of adjusting it to the desired bend; this guide governs the lateral motion of the top piece F, to which one end of the timber is attached during the operation of sawing, the other end of the stick being fastened to the head block D. J, J, are adjusting screws for altering the position of the guide I to conform to the crook required. All the other parts of the mill are the same as those in common use, and to which my improvement may be readily attached.

The operation of my improvement is simply as follows: The stick to be sawed being placed upon the carriage and made fast to the head block D, and the top piece F; the guide I is adjusted to the bend of the timber by means of the screws J, J; then upon the mill being put in motion the stick will be carried up to the saw so that the cut will be made in the direction of the grain of the wood, (or nearly so,) through the means of the guide I. The guide I may also be adjusted in a line with the ribbons A, A, so that there will be no lateral motion to the top piece F, consequently a perfectly straight cut may be made when it is so desired.

Among the advantages I claim for my improvement is the great saving of material by cutting in the direction of the grain of the timber; its great facility for adjustment, and its being self operating when once adjusted.

What I claim as my invention and desire to secure by Letters Patent is—

Giving to the top pieceF, of the tail block a lateral motion by means of the adjustable guide I, substantially as, and for the purposes herein set forth.

THOMAS MILES.

Witnesses:
 WM. H. LOW,
 M. MAGINNES.